Nov. 29, 1966 C. H. CLARK ET AL 3,289,189

APPARATUS FOR FEEDING AND STEPPING A MAGNETIC TAPE

Original Filed April 3, 1962 5 Sheets-Sheet 1

INVENTORS
CLAYTON H. CLARK
DONALD J. STEFANIK
Strauch, Nolan, Neale, Nies and Bronaugh
ATTORNEYS

APPARATUS FOR FEEDING AND STEPPING A MAGNETIC TAPE

Original Filed April 3, 1962 5 Sheets-Sheet 2

INVENTORS
CLAYTON H. CLARK
DONALD J. STEFANIK

Strauch, Nolan, Neale, Nies and Bronaugh
ATTORNEYS

INVENTORS
CLAYTON H. CLARK
DONALD J. STEFANIK
BY Strauch, Nolan, Neale, Nies and Bronaugh
ATTORNEYS

APPARATUS FOR FEEDING AND STEPPING A MAGNETIC TAPE

Original Filed April 3, 1962 5 Sheets-Sheet 4

INVENTORS
CLAYTON H. CLARK
DONALD J. STEFANIK

BY Strauch, Nolan, Neale, Nies and Bronaugh
ATTORNEYS

APPARATUS FOR FEEDING AND STEPPING A MAGNETIC TAPE

Original Filed April 3, 1962

INVENTORS
CLAYTON H. CLARK
DONALD J. STEFANIK

BY Strauch, Nolan, Neale, Nies and Bronaugh
ATTORNEYS

United States Patent Office 3,289,189

Patented Nov. 29, 1966

3,289,189

APPARATUS FOR FEEDING AND STEPPING A MAGNETIC TAPE

Clayton H. Clark, Mundelein, and Donald J. Stefanik, Berwyn, Ill., assignors to SCM Corporation, New York, N.Y., a corporation of New York Original application Apr. 3, 1962, Ser. No. 184,820. Divided and this application Aug. 23, 1965, Ser. No. 481,798

6 Claims. (Cl. 340—174.1)

This invention relates to a magnetic tape recorder primarily intended for use in telegraphic communication equipment.

This application is a division of copending application 184,820, filed April 3, 1962.

The inventive equipment is versatile, compact and reliable and to this end a completely new, extremely small, magnetic tape recorder was developed, capable of remote control of record, rewind and playback operations.

A primary object resides in the provision of a novel magnetic tape recorder assembly arranged in compact, substantially self-contained organization capable of recording, rewind and playback under control of remote signals.

Still another object resides in a novel recorder package utilizing magnetic tape and storing each information signal of multiple bit codes in digital serial form on the magnetic tape.

Another object resides in the provision of a novel magnetic tape recorder including in the recorder package a tape supply reel and an associated tape take-up reel, a feed and step drive mechanism and a rewind mechanism, the drive mechanism providing a direct driven tape feed movement ahead of the recorder head, followed by permissive stepping movement of the tape across the head under the force of a novel spring drive mechanism, assuring a constant speed of the tape past the head regardless the load on the feed mechanism.

A still further object resides in providing a novel sprocket driven magnetic tape recorder unit utilizing a unique rewind mechanism including a negator spring provided with a force storage during operation in a recording or reading mode as a result of the sprocket drive, a novel gear shift arrangement and mechanism operating in conjunction therewith for releasing the stored force of the negator spring to rewind the tape. In conjunction with this object it is a further object to provide an electronic control mechanism operating in coincidence with tape stepping and driving spring power storage movement to accurately determine and control the start and stop positions indicative of tape supply conditions, and to determine and provide a signal indicative of the approaching of an end of tape condition.

Further novel features and other objects of this invention will become apparent from the following detailed description, discussion and the appended claims taken in conjunction with the accompanying drawings showing a preferred embodiment, in which:

*General*

An over-all description of the exemplary teletypewriter set is shown and fully described in parent application Ser. No. 184,820. That set is a send-receive teletypewriter set designed for keyboard sending and magnetic tape recorder sending, page copy monitoring and page copy receiving. Two or more sets can be interconnected directly and operated with, or without, the use of intermediate equipment. Simultaneous sending and receiving is possible with a set, one call being received on one printer of the set, a second call being sent from either the keyboard or the tape recorder 108. The tape recorder mechanical construction constitutes the subject matter of this application.

*Magnetic tape recorder unit mechanics*

The recorder unit 108 is an extremely rugged and compact, magnetic tape, combination recorder and reader. Actual dimensions of an exemplary production unit approximate 5" x 5" x 4". Its power, insofar as tape movement is concerned, is derived wholly from a self-contained feed solenoid, rewind power being derived from a negator spring which is wound by and stores energy derived from the feed solenoid during tape take-up movement. The tape is a semi-permanently installed, thin plastic strip coated with a film of magnetizable oxide. A suitable plastic for making the tape body is "Mylar."

The tape recorder, as has been described in the parent application, utilizes part of the keyboard electronics during storing and playback transmission of messages and hence, in that communication set, is inter-related electrically, electronically and functionally with the keyboard unit. Nevertheless, it is to be understood that the magnetic tape recorder can be constructed as a unit, apart from the described inter-relationship in the communication set if a requisite portion of the mode selection panel and associated control electronics are included with the unit, however the read-in control, read-out control and electronics are not per se a part of the mechanical invention claimed herein and hence will not be described. The recorder, with appropriate logic, could take the place of (1) a tape perforator and (2) a tape reader-transmitter. As will be described for the exemplary embodiment, the tape supply is only sufficient for a single normal message (3600 characters), however the recorder could be structurally enlarged to mount larger tape spools and the tape drive power mechanism could be modified to drive and rewind the larger take-up and supply, as by an electric rotary motor or a stronger feed solenoid for take-up and a motor drive for rewind.

Figure 1:
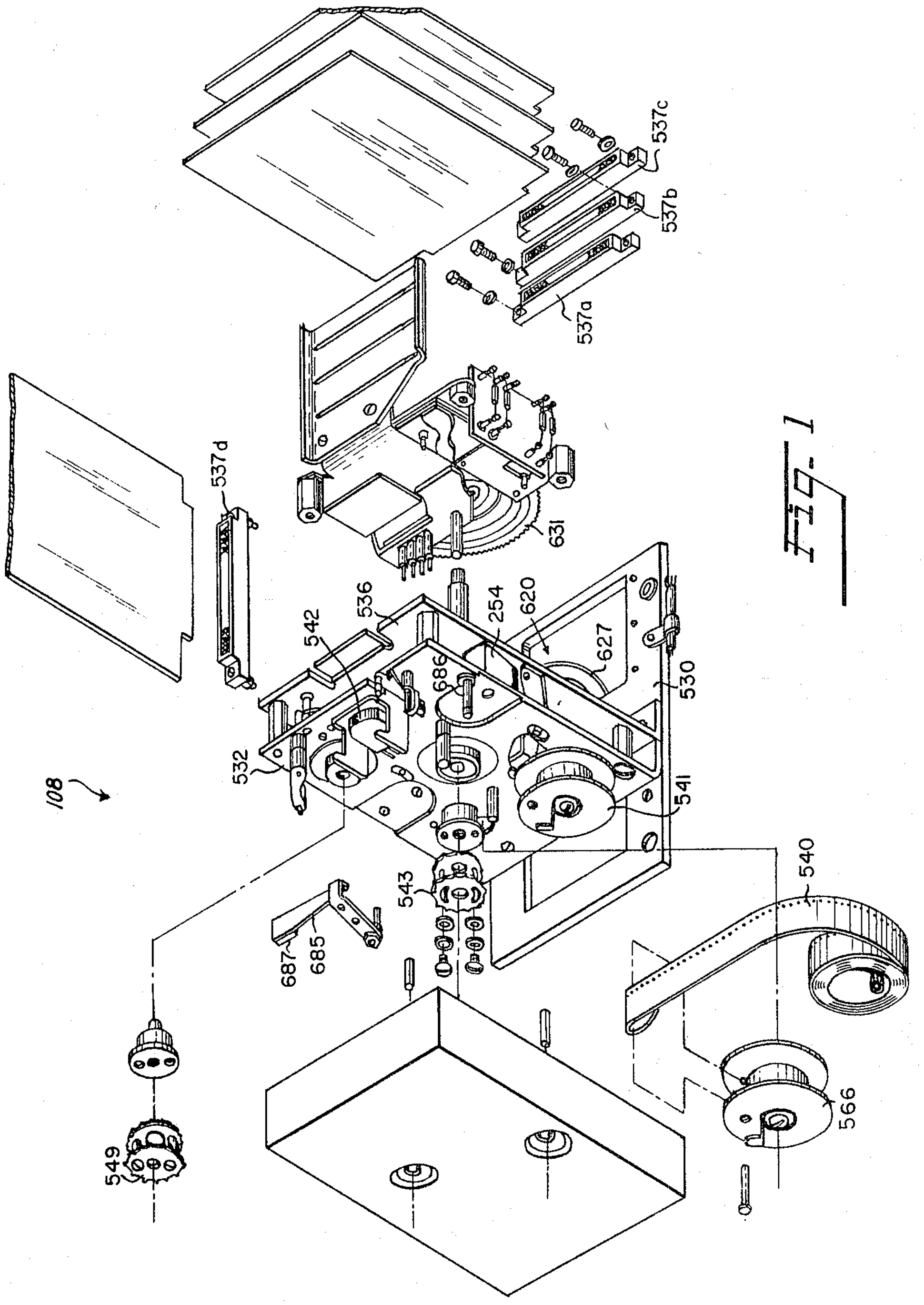
FIGURE 1 is a partially broken away and partially exploded perspective view of the magnetic tape recorder structure.
Figure 3:
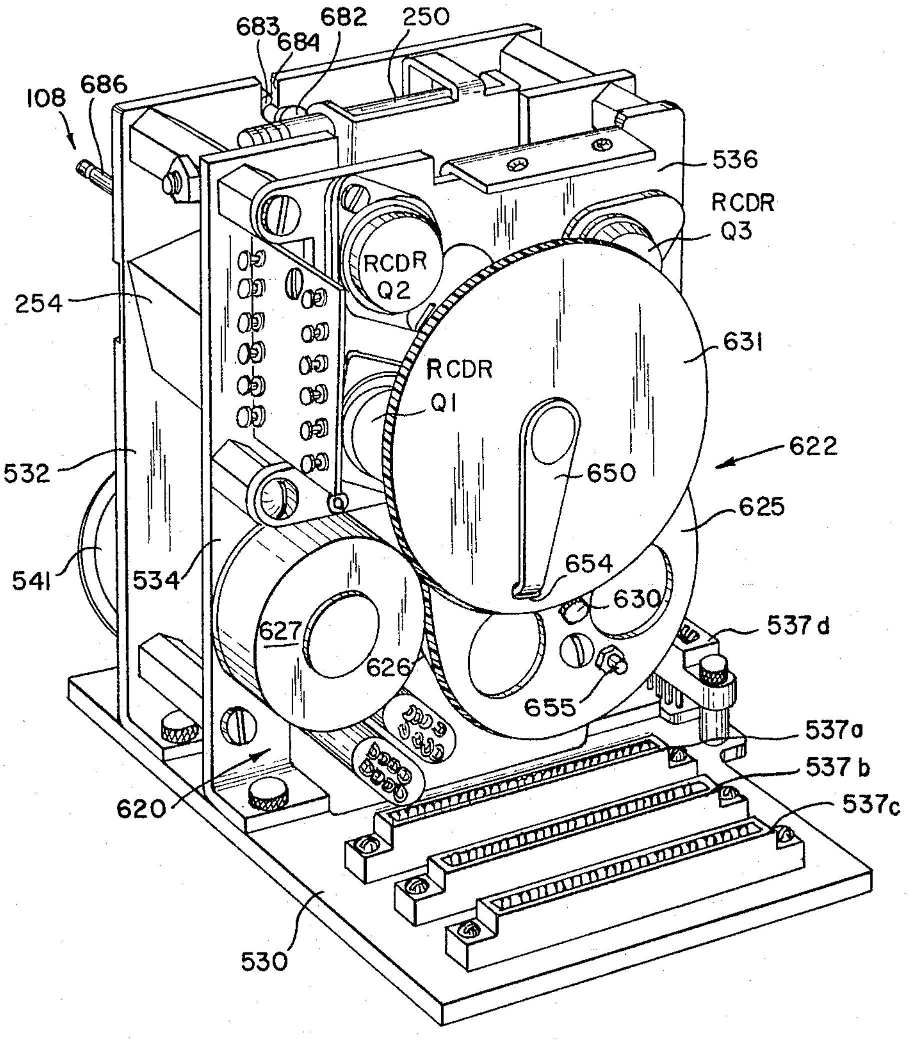
FIGURE 3 is a rear perspective view of the recorder unit with the printed circuit boards removed.

With reference to FIGURES 1 and 3, the recorder unit 108 has a basic support structure constructed of a base plate 530 apertured to be bolted in assembled position on a suitable base, a vertical front mounting plate 532 and a vertical mid-mounting plate 534 both of which are suitably, rigidly secured to the base plate and to each other. An auxiliary, rear mounting plate 536 is secured by bolts to and spaced from the rear of the mid-plate 534. Four printed circuit board sockets 537*a*, *b*, *c* and *d* are suitably fastened by screws to the base plate 530. Printed circuit boards 538*a*, *b*, *c* and *d* (see FIGURE 1) plug into appropriate ones of the sockets 537*a*–537*d*, are clamped to the vertical mounting plates and will contain the major portion of the recorder electronics. Three of the recorder solenoid driver transistors Q1, Q2 and Q3 are seen in FIGURE 3 mounted on the rear surface of the auxiliary bracket 536 which provides an adequate heat sink for the high power ZN458 transistors.

The mechanical tape driving and rewind mechanism will be described primarily with reference to FIGURE 2 and with secondary reference to FIGURE 1 and 3–8 for details. The front and rear perspectives afforded by FIGURES 1 and 3 provide an idea of the concise compact arrangement of the mechanism which is skeletonized and considerably expanded for clarity in FIGURE 2.

*Tape feed and step*

FEEDING is the operation which feeds a discreet signal portion of the tape 540 (0.1″) toward the recording head 542 in preparation for the stepping operation. The head 542 is mounted on the front side of front mounting plate 532 and includes two cores for combination 2-track, alternative recording and reading, one core carrying a record clock and a playback clock winding respectively and the other core carrying a record character and a playback character winding respectively.

The tape 540 has feed sprocket perforations, is stored on a supply spool 541, threads around an idler roller 542 journalled on a fixed stud in the front plate, around a toothed feed sprocket wheel 543, thence around a stabilizer roller 544 and to and over the recorder head 542.

The tape is held against the feed sprocket wheel 543 by a tape guide foot 545 which is mounted on two releasable studs secure don front plate 532. Clips on the ends of both studs rigidly maintain the guide 545 in proper position. The upper stud 546 also serves as a pivot post for a spring biased vertically disposed stabilizer roller lever 547, the upper end of which carries the stabilizer roller 544. Note that the stabilizer spring 548 biases the stabilizer roller 544 against the tape to take up the feed generated slack and any other incidental slack in the tape between the feed sprocket wheel 543 and the stepping sprocket wheel 549. As will be hereinafter described, the stabilizer roller effect is negated during REWIND.

The power to feed the tape 540 is obtained from the feed solenoid 246 which is mounted on the rear side of the front mounting plate 532. When feed solenoid 246 is energized (see also FIGURE 6), solenoid plunger 532 is pulled into the coil. Plunger 552 is pinned to a feed lever link 553 which in turn, is pinned to a feed lever 554 pivoted on the rear of the front plate. Lever 554 pivotally carries a spring biased driving pawl 555 and forces it into drive engagement with a feed ratchet wheel 556 and forces the ratchet wheel to rotate one tooth, the amount of feed rotation being limited by an adjustable feed pawl eccentric stop pin 557.

Ratchet wheel 556 is non-rotatably secured to the feed sprocket wheel shaft 558 and thus rotates the feed wheel 543 and causes the tape 540 to *feed* one space toward the recorder head 542. The feed solenoid 246 in de-energizing, allows spring 559 to pull the solenoid plunger

552, the feed lever link 553, and the feed lever 554 back to their normal positions. The normal position is with the feed lever 554 against a second adjustable eccentric stud 560.

A feed ratchet detent pawl 562 is pivotally mounted on a pin fixed in the front side of the mi dplate 534 so the detent pawl is disposed substantially diametrically opposite the drive pawl 555. Detent pawl 562 is biased by a coil spring 563 with its tooth in such engagement with the feed ratchet 556 to prevent the feed shaft 558 from rotating backwards. Clearly seen in FIGURE 2, short levers 564 and 565, rigid with the feed drive pawl 554 and feed detent pawl 562, respectively, are directly toward the feed shaft 558 and constitute ratchet release fingers utilized to lift both of the pawls away from ratchet engagement during a REWIND operation, as will be hereinafter described. After the just described single tape feed step action of the feed sprocket 543 is completed, the stabilizer roller 544, under the bias of its spring 548 takes up the slack which was provided by the feed step and keeps the tape taut.

STEPPING is the operation which actually moves the tape 540 over the recording head 542 and thence toward the take-up spool 566. A tape stepping action invariably occurs immediately following a feed action. The accurately indexed amount of slack which is placed in the tape 540 by the tape feed operation, is pulled over the recording head 542 by the take-up step sprocket wheel 549, over which the tape passes and feeds downwardly to the take-up spool 566. Power to step rotate the stepping sprocket 549 is always constant, being derived from a coil spring 567 in an escapement controlled lost motion step drive mechanism 568 shown schematically in FIGURE 2 and in detail in FIGURES 7 and 8. A gear 569 secured to rotate with feed sprocket shaft 558, meshes with an idler gear 570, freely rotatable on a post fixed to the rear side of front plate 532, the idler gear in turn driving a stepping input gear 571 which is freely rotatably mounted on the step sprocket shaft 572. Feed shaft gear 569 and stepping gear 571 have the same number of teeth and hence, stepping gear 571 rotates in the same direction and through an accurately indexed angular increment equal to the indexed angular increment of drive which was imparted to the feed sprocket wheel 543 by the feed drive pawl 555.

Non-rotatably fixed to the stepping sprocket shaft 572 is a toothed escapement stepping ratchet 574. Two spaced apart coaxial plates 575 and 576 (see FIGURE 7) are non-rotatably secured in facing, slightly apart relationship to the stepping gear 571 and stepping ratchet 574, respectively. Gear plate 575 has three lugs 577 and 579 (see FIGURE 8) extending axially toward the ratchet plate 576, designated as driving lug 577, stop lugs 578 and, rewind stop lug 579. The two lugs 578 and 579 straddle a stepping ratchet plate stop lug 581 with sufficient clearance to enable an indexed angular increment of play between the gear 571 and ratchet 574 when the gear 571 is rotated one feed space. (Note: as will be described the ratchet 574 *cannot rotate* while the gear 571 is being driven through the gear train from the feed shaft 558.) The aforedescribed escapement coil tension spring 567 is anchored between the gear plate driving lug 577 and the ratchet plate driven lug 580. Thus, when the stepping gear 571 rotates one index space, its stop lug 578 rotates the one index space away from the ratchet stop lug 581 and stops, at the same time the gear driving lug 577 rotates one space, tensions the spring 567 and stops. A one space stepping condition is thus pre-set to occur, under a standard spring tension force, for the stepping ratchet 574, its shaft 572 and the stepping sprocket 549 which is non-rotatably connected to shaft 572.

Control of the stepping sprocket 549 is accomplished by a pen type step solenoid 250 which is mounted between the front and mid mounting plates by a suitable bracket secured to the upper portion of the mid mounting plate 534. The solenoid plunger 586 is forced out of the solenoid coil when it is energized, engaging a lever abutment 587 on a stepping ratchet pawl 588 to pivot the pawl 588 away from engagement with the toothed stepping ratchet wheel. This release will permit the tensioned drive spring 577 to rotate the ratchet wheel 574, its shaft 572 and the stepping sprocket 549 one space, where the ratchet plate stop lug 581 abuts the now stopped gear lug 578 to limit the stepping increment. The stepping pawl 588 is pivotally mounted on a post 589 fixed in the mid mounting plate and is biased toward engagement with ratchet wheel 574 by a coil tension spring 590. The solenoid 250 is almost immediately de-energized, permitting the step pawl to spring back and block the next ratchet tooth.

The tape stepping sprocket 549 thus pulls the indexed slack in the tape (0.1"), which was previously fed by the feed sprocket 543, over the recording head 542 at a constant rate. As the tape 540 is stepped over the stepping sprocket 549 the slack is taken up on the take-up reel 566 which is driven through a friction coupling by mechanism now to be described, at a higher angular speed than that of the feed and stepping sprocket wheels to keep the tape taut between stepping sprocket wheel 549 and the take-up spool 566.

Figure 9:
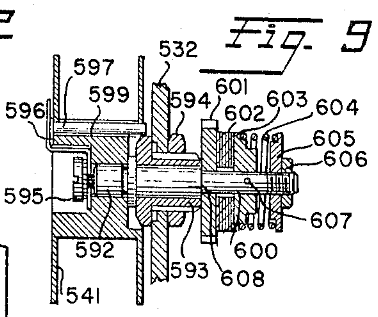
FIGURE 9 is a vertical cross-section view illustrating the friction clutch and drive gear as used on each tape spool.

Both the supply spool 541 assembly and the take-up spool 566 assembly are identical and hence only one will be described in detail with reference to FIGURE 9. A spool shaft 592 is rotatably journalled in a threaded bushing sleeve 593 secured by a nut 594 through an aperture in the front mounting plate 532. The hub of tape spool 541 is slid over a short stub front end of shaft 592 and securely clamped to the shaft by a screw 595 and a washer which also secures a tape retaining pin, bent lock clip 596. The mylar tape 540 has a preformed end loop (not shown) which is retained to the spool 541 by a pin 597 disposed through an appropriate aperture and into a groove 599 in the outer periphery of the spool hub. Before pin 597 is inserted, the tape end loop is placed between the spool flanges and into the groove 599, so when pin 597 is inserted into the spool, it passes through the tape loop. Clip 596 will retain the pin 597 in its tape loop retaining position.

The other end 600 of spool shaft 592, which projects past the rear end of its bushing 593, is made with a reduced diameter, has a threaded end and carries a rotatably mounted spool gear 601, a felt friction disc 602, a pressure plate 603, a coil pressure spring 604, a spring retainer plate 605 and retaining nut 606. The pressure plate 603 has its bore axially slotted to coact with a pin 607 fixed transversely in shaft 592, so that pressure plate 603 may have some axial play but is non-rotatably secured to shaft 592. The spring 604 presses the pressure plate 603, felt disc 602 and gear 601 against the shaft shoulder 608 and constitutes a friction slip coupling between gear 601 and spool shaft 592. The compression of spring 604 may be pre-adjusted by nut 606 but need not be very great in the exemplary embodiment since the combined weight of the spools and the tape is quite light. Gear 601 on the supply spool 541 and gear 601' on the take-up spool 566 are identical and have a less number of teeth than the feed gear 569 and stepping gear 571. Therefore, since each derives its drive (when driven) by a direct gear train to the feed gear 569, each will tend to be driven a greater angular increment than the feed increment during each increment of feed shaft rotation, although as soon as the tape is taut the spool gear which is being driven will slip relative to the spool via the friction coupling.

During tape recording or playback the tape passes from the supply spool 541 to take-up spool 566 in a drive path connected through a shiftable idler gear 610 which meshes with feed shaft gear 569 and is carried by and rotatably journalled on a swinging shift lever assembly 611 which is pivotally carried by and depends from the feed shaft 558 between the front and mid mounting plates. Idler gear 610 always remains in mesh with feed shaft gear 569 and can be swung into mesh with either one of the spool gears 601 or 601' by a controlled pivotal shift of the depending support lever 611 which is rocked by mechanism to be later described. Normally idler gear 610 is positioned to mesh with the take-up spool gear 601' in which position it is free from meshed engagement with the supply spool gear 601. The spacing of the two spool gears 601 and 601' is such that just before the teeth of idler gear 610 leave engagement with one of the spool gears 601 or 601' they will start into engagement with the other gear. During the REWIND mode of recorder operation, the idler gear 610 is swung away from take-up spool gear 601' and into mesh with the supply spool gear.

Figures 10, 12:
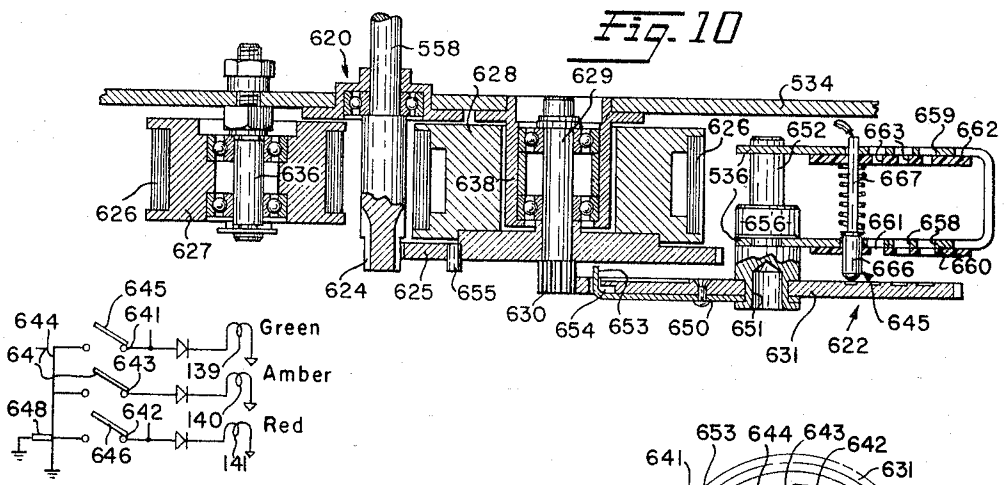
FIGURE 10 is a cross-section lay-out view of the negator spring and commutator assembly.
FIGURE 12 is an electrical detail schematic of the commutator circuit.

Turning to FIGURE 10, it will be seen that stepping sprocket wheel 549 has a main body portion 614 with a hub to which is pinned a flat sprocket toothed disc 615. The disc is maintained in assembly by a rim ring 616, the centerhub sleeve of the main spool body 614 being swaged or spun over to tightly clamp and retain the ring 616 and toothed disc 615 in place. The wheel hub 617 is in the form of an axial sleeve with a cross slot fitted over a transverse drive pin 618 in the stepping wheel shaft 572. Wheel 549 is thus non-rotatably connected to shaft 572 and is maintained on the shaft by a ring clip. The feed sprocket wheel 543 is constructed and secured to the feed shaft 558 in a manner similar to that just described for the stepping sprocket wheel 549.

Before proceeding to the mechanics by which the REWIND operation is accomplished, the description will now turn to the negator spring and commutator assembly.

Figure 2:
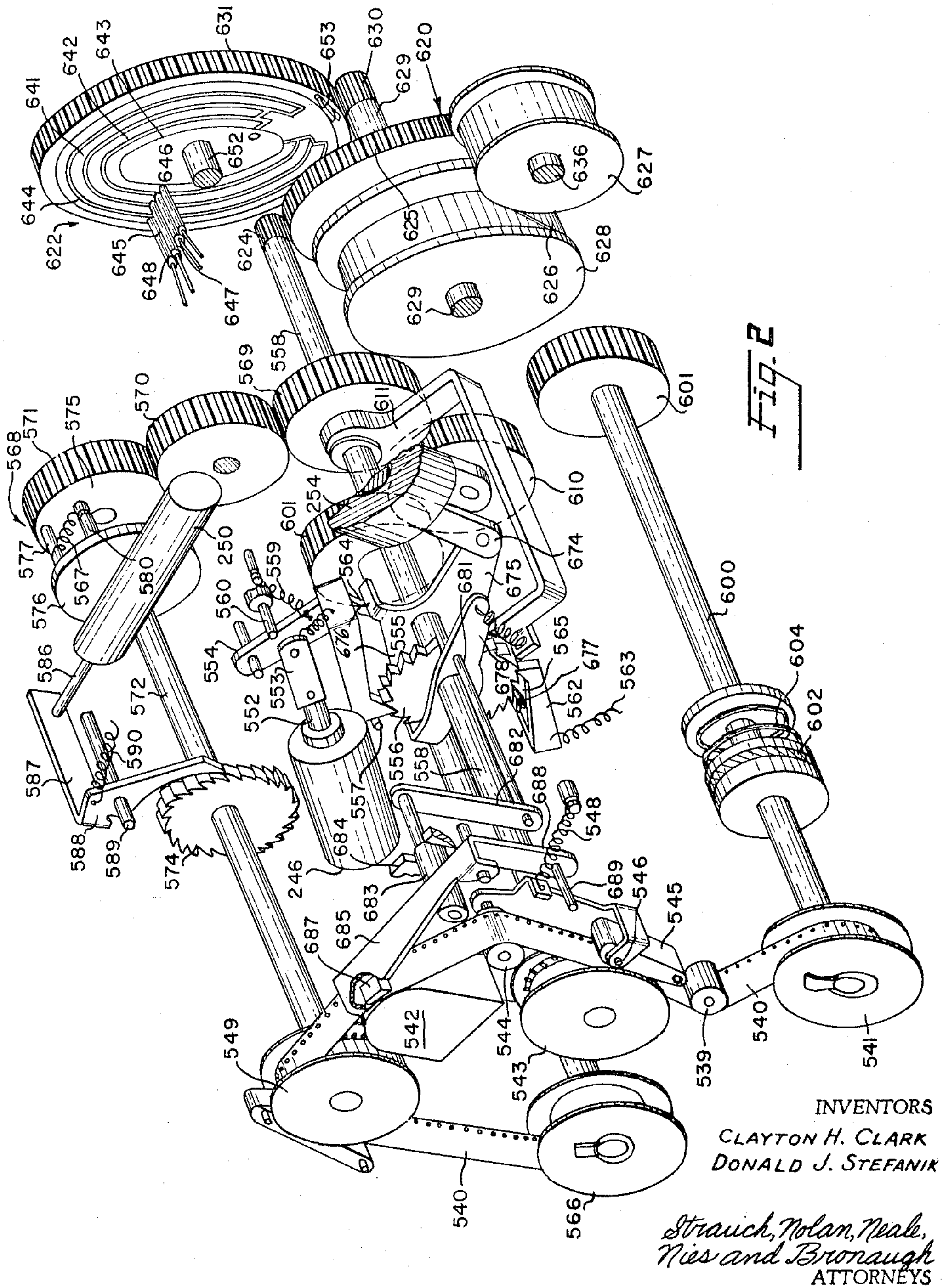
FIGURE 2 is a skeletonized perspective view illustrating all of the tape recorder drive trains, and includes the tape wheels; sprocket wheels, solenoids, negator spring and commutator gear.

THE NEGATOR AND COMMUTATOR assemblies 620 and 622 respectively are shown in skeleton arrangement in FIGURE 2, in detail layout cross-section in FIGURE 10 and in rear view perspective in FIGURE 3. The negator spring assembly 620 is mounted on the rear of mid mounting plate 534 and the commutator assembly 622 is mounted on the auxiliary mounting plate 536.

Each time the feed solenoid 246 is energized to rotate the feed ratchet 556, a small pinion gear 624 on the end of feed sprocket shaft 558 rotates a negator gear 625. This rotation unwinds a flat, crowned steel strip negator spring 626 from a negator spring supply spool 627 onto a spring output spool 628. This spring 626, wound up on spool 628, stores a bias force attempting to wind itself back on the supply spool 637 and thereby supplies a power source for the rewind operation. On the negator gear shaft 629 is mounted a pinion gear 630 which meshes with a large dielectric commutator gear 631.

Shown in FIGURE 10, the feed sprocket shaft 558 projects rearwardly through a bearing in mid mounting plate 534 and extends past the two negator spring spools 627 and 628, and has its terminal end cut to provide the integral small pinion 624. The small diameter negator spring supply spool 627 is freely rotatably mounted on bearings on a journal post 636 securely fastened to the mid plate 532 by nuts. One end of the crowned spring 626 is anchored to the supply spool and the spring is pre-set in a shape to coil itself around the small supply spool 627.

The large negator take-up spool 628 is non-rotatably and coaxially fastened to one side of the large negator gear 625 which in turn is non-rotatably secured to its shaft 629, as by a tight press fit. Negator gear shaft 629 is rotatably mounted in bearings retained in a retainer cup 638 which is fastened in an aperture in the mid mounting plate 534 and is disposed with its base directly rearwardly. The negator take-up spool 628 has a coaxial opening sufficiently large to freely fit over the bearing retainer cup 638 so that the two spools 627 and 628 are positioned in coplanar relationship, i.e., so that the negator spring 626 can be pulled off the supply spool in a straight path and be rewound on the take-up spool to which its other end is anchored. The large negator gear 625 is mounted so as to be in continuous mesh with the feed sprocket shaft pinion 624, and as the feed shaft is rotated in incremental feed steps, the negator gear will slowly pull the crowned pre-coiled spring 626 off the small supply spool and wind it on the much larger diameter take-up spool 628. It is a tendency of such crowned pre-set springs that they tend to wind themselves back to their original pre-set coiled dimension, and therefore the spring exerts a bias force on the take-up spool to rotate in the reverse direction as the spring attempts to rewind itself on supply spool 627. This reverse direction of rotation is, of course, normally prevented because negator gear 625, the meshed pinion end of feed sprocket shaft 558 and the engaged feed sprocket pawl 555 and its detent pawl 562 prevent such reverse rotation, except during a rewind operation, as will be described hereinafter.

The negator driven pinion gear 630 on negator gear shaft 629 may be separable or integral with the negator gear shaft, but in any event it is non-rotatably secured on the shaft 629, projects from the rear face of the negator gear 625 and provides a direct, but greatly stepped-down, drive from the feed sprocket shaft 558 to the dielectric commutator gear 631. In a sense this is also a direct drive connection from the stepping sprocket which differs from the feed sprocket only by the one lost motion spacing step in the feed direction and follows exactly in the rewind direction. Thus, the angular position of the commutator gear is a direct indication of the number of rotations of the feed and stepping sprocket wheels, and as such is used to determine (1) a start-of-tape position, (2) a 96% tape-out position, and (3) an end-of-tape position.

Figure 11:
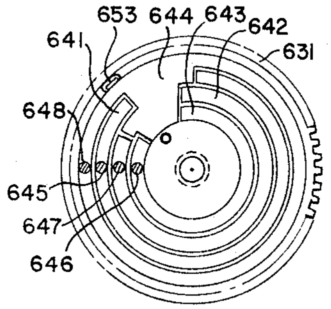
FIGURE 11 is a detailed view of the printed circuit on the commutator gear.

The front face of the dielectric commutator gear 631 (see FIGURE 11) has four strips of copper 641, 642, 643 and 644 pressed onto it. When the gear 631 is mounted on auxiliary bracket 536, one of four contact plungers 645, 646, 647 and 648 rests against an associated one of these copper strips. Three of the copper commutator strips are called: the start-of-tape strip 641, 96% tape-out strip 642, and end-of-tape strip 643, while the fourth unbroken strip 644 is connected by a contact 648 to ground potential. When the commutator gear 631 has traveled 96% of one full turn, one of the contact plungers 647 shorts the 96% strip 643 to the ground strip 644, completing an electrical circuit and energizing the 96% amber lamp 140 on a control unit (see FIGURE 12). At the end-of-tape position and at the start-of-tape position a similar shorting to ground by respective plungers 646 and 645 occurs for the other two commutator strips 642 and 641, respectively. When the gap moves away from the contact plunger, the circuits are broken and the respective lamps are de-energized.

Seen in FIGURE 10, the commutator assembly 622 (the gear 631 and contact plungers 645) is mounted on depending parallel walls of the rear auxiliary mounting plate 536. The dielectric gear 631 and a mechanical stop arm 650 fit over a sleeve hub 651 on the end of a stub shaft 652, the hub 651 being swaged or spun over to clamp and hold the stop arm and gear securely to the stub shaft 652. Stop arm 650 is disposed radially on the rear face of dielectric gear 631, extending to a terminal position close to the gear periphery where it ends in a forwardly bent stop finger 653 which passes through a slotted aperture 654 in gear 631 and projects a short distance from the front face of the dielectric gear. Stop finger 653 coacts in an abutment limiting relationship with a pin 655 fixed in and projecting from the rear face of negator gear 625 at the end-of-tape position and start-of tape position, thereby providing a positive mechanical safety limit stop at both positions.

Commutator gear shaft 652 is rotatably fitted in coaligned holes in the spaced apart fore and aft walls of the auxiliary bracket 536, so the dielectric gear 631 is disposed to continually mesh with the negator shaft pinion 630 and is maintained in axial position by a collar 656 fastened by a set screw.

The spaced-apart auxiliary bracket walls are both pierced by an aligned set of four holes 658 and 659 which are made of sufficient size to permit coaxial positioning of the four contact plungers 645–648 with clearance, only one plunger 645 being shown in FIGURE 10. Overlying the holes 658 and suitably fastened to one wall of the auxiliary bracket plate 536, is one dielectric plate 660 with four plunger head guide holes 661 coaxially disposed relative to associated holes 658. Overlying the holes 659 and suitably fastened to the other wall of the auxiliary bracket 536 is a second dielectric plate 662 with four plunger shank guide holes 663, coaxially disposed relative to associated holes 659 and to the associated plunger head guide holes 661.

All four contact plungers are like the one plunger 645 seen in FIGURE 10, each plunger being made of highly conductive material, e.g., bronze or silver plated steel or copper, and having a contact bearing head 666 which is guided in one of the large guide holes 658 and a reduced diameter shank 668 which is guided in an associated small guide hole 663. Each plunger head 666 is spring biased against its appropriate commutator contact strip, which is strip 641 for plunger 645, by a coil compression spring 668 which is retained between dielectric plate 662 and a washer 669 placed over the plunger shank and against the shoulder of the plunger head 668. The appropriate electrical connections are made to the ends of the plunger shanks and tie the commutator into the recorder circuit indicated in detail FIGURE 12.

*Rewind.*—After a message has been recorded, it is necessary to rewind the magnetic tape 540 before transmitting to the outgoing line. Power to rewind the tape 540 is obtained from the negator spring 626. To initiate rewind of the tape 540, the rewind solenoid 254, which is mounted on the rear face of front mounting plate 532 (see FIGURES 5 and 2) is energized, pulling its plunger 674 into the coil against the stress of a solenoid plunger spring. A U-shaped rewind bracket 675 with an arm pivotally attached to the end of solenoid plunger 674 rotates counterclockwise around its pivot mounting on the feed shaft 558 adjacent the feed ratchet 556 and feed shaft gear 569. This REWIND movement of bracket 675 moves two diametrically disposed bent lugs 676 and 677 (one seen in FIGURE 5 and both shown in FIGURE 6) into respective engagement with the aforedescribed feed pawl and feed detent pawl release fingers 564 and 565 to pivot both of pawls 555 and 562 clockwise away from engagement with feed ratchet 556, against the bias force of their respective springs 559 and 563.

At the same time that it releases the feed shaft ratchet 556, which frees the feed shaft 558 to rotate in its reverse or rewind direction under the stored power in the negator spring 626, a third ear 678 on the rewind bracket 675 moves away from an abutment 679 on the idler shift gear lever 611. A connecting tension spring 680 from rewind bracket 675 to idler shift lever 611 pulls the idler shift lever 611 counterclockwise and moves the idler gear 610 out of engagement with the drive gear 601′ of the take-up spool 566 and engages the idler gear with the supply spool drive gear 601.

Figures 4, 5, 6:
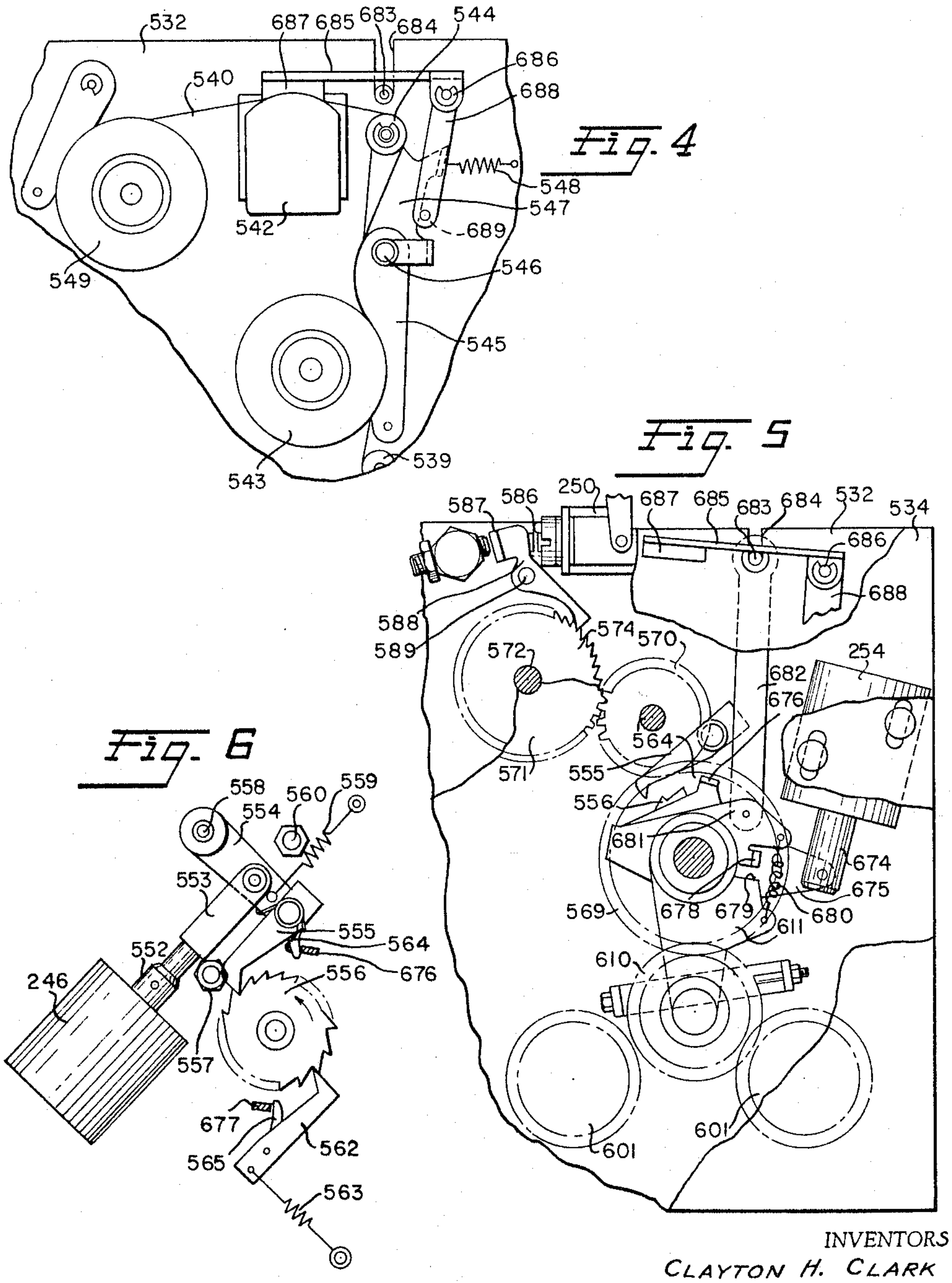
FIGURE 4 is a detail view looking at the front of the recorder and illustrates the tape feed and stepping wheels and the path of the tape as it passes over the record and playback head.
FIGURE 5 is also a detail view looking from the front of the recorder but with the front plate substantially broken away to illustrate the stepping mechanism and the rewind mechanism, the rewind solenoid being shown in energized position.
FIGURE 6 is a further detail view of components just behind the front plate and can be better oriented by visualizing it as an overlay on FIGURE 5, showing the tape feeding solenoid and its linkage to the feed pawl seen in FIGURE 5.
Figure 7:
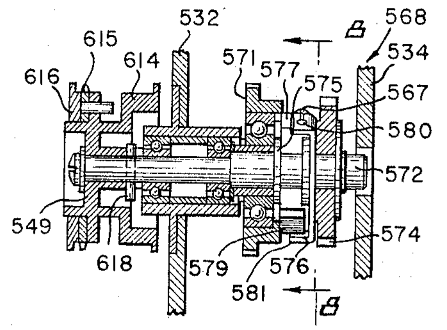
FIGURE 7 is a vertical cross-section view illustrating the arrangement of the spring biased lost motion stepping mechanism for the tape stepping wheel.
Figure 8:
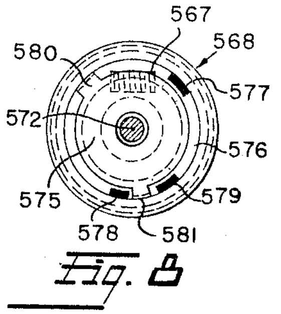
FIGURE 8 is a section taken on line 8—8 of FIGURE 7.

Attached to another ear 681 of the rewind solenoid bracket 675 is an upright link 682, the upper end of which carries a roller 683 projecting forward through a vertical guide slot 684 in the front mounting plate 532. Turning now to FIGURE 4, and with continued reference to FIGURE 2, the upward shift of the link carried roller 683 during the rewind shift of solenoid bracket 675 causes the roller to engage and lift a tape pressure arm 685. Pressure arm 685 is pivoted on a post 686 in the front mounting plate and has a soft tape pressure pad 687. A depending arm 688 on pressure arm 685 is biased by spring 548 in a direction which causes pad 687 to press the magnetic tape 540 against the recording head 542 during record and playback. When the roller 683 is raised upwardly, and the pressure arm 685 is thus raised to release the pressure of pad 687, a pin 689, which is abutted by the stabilizer roller lever under bias force of spring 548, forces the stabilizer roller lever counterclockwise to release the stabilizer roller pressure on tape 540.

With the rewind solenoid bracket 675 rotated by energization of rewind solenoid 254, the negator spring 626 is now free to unwind from the spring output spool 628 back onto the negator supply spool 627. This action causes negator spool gear 625 to drive the tape feed sprocket shaft 558 backwards which through the described gear train drives both the feed sprocket 543 and stepping sprocket 549 backwards at the same speed, pulling the tape 540 from the now disengaged, freely rotatable take-up spool 566, around the stepping sprocket wheel, over the recording head, past the feed sprocket and to the positively driven tape supply spool 541, the idler gear 610 now being enmeshed with the tape supply spool drive gear 601, and driven backwards by the feed shaft gear 569.

When the tape is fully rewound, the previously described stop arm finger 653 on the commutator gear 631 hits the stop pin 655 on the negator gear 625, affording a mechanical stop of the rewind rotation. Also the start-of-tape strip 641 on the commutator gear is shorted by the contact plunger 645, which lights the green start of tape lamp 139, starts the advance multivibrator 242 which sets the REWIND register 252 de-energizing the rewind solenoid 254 and, as has been previously described, feeds and steps the magnetic tape 540 three or more times as necessary to rotate the commutator away from start position. When the tape has stepped three times, the recorder is ready to play back the message or record a new message.

Figure 13:
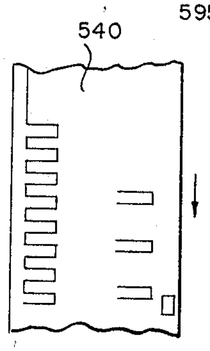
FIGURE 13 is an enlarged detail view of a segment of tape with a clock and character digital pulse pattern superimposed.

FIGURE 13 is a greatly enlarged segment of tape 540 illustrating how the pulses of a single character are stored along with eight sync clock pulses in two track, digital serial form on the tape during the stepping movement.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A magnetic tape recorder and playback apparatus including a magnetic tape supply, recorder-reader head means, and means for moving the tape in steps past the head means during recording and reading including a combination tape feed and tape stepping drive mechanism comprising: means in said drive mechanism operable to provide a direct driven tape feed movement ahead of said head means, and means operable subsequent to said tape feed movement for accomplishing a constant rate stepping movement of said tape past the head under power derived and stored from the preceding tape feed movement.

2. A magnetic tape recorder and playback apparatus as claimed in claim 1, wherein said magnetic tape supply includes a magnetic tape supply spool, an associated magnetic tape take-up spool, a length of magnetic recording tape and a rewind mechanism, said rewind mechanism comprising: a spring storage device coupled with said tape feed mechanism for storing power derived from said feed action during recorder operation in record or playback, a gear shift mechanism between said feed mechanism and said supply spool and said take-up tape spools for shifting feed drive from said take-up spool to said supply spool, and rewind control means connected to an operative member on said gear shift arrangement for: releasing the stored force of said spring storage device and disabling power connection of said feed mechanism, shifting said gear drive to connection with said tape supply reel and simultaneously permitting the stored energy from said spring storage device to pass back through a portion of said feed mechanism to power drive said supply reel and rewind the magnetic tape.

3. A magnetic tape recorder and playback apparatus as claimed in claim 2, including a control mechanism operated directly and in coincidence with the tape stepping and the rewind spring power storage mechanism enabling accurate determination and control of the start and stop positions indicative of magnetic tape supply condition, and enabling determination and provision of a signal indicative of the approach of an end-of-tape condition.

4. A magnetic tape recorder and playback apparatus as defined in claim 3, wherein said control mechanism comprises: an electrical, multiple contact switching commutator having a high ratio, step down, direct drive connection from said feed mechanism drive train; the limit travel positions of said commutator being directly related to a start-of-tape position and to an end-of-tape position and having a start-of-tape switch contact at one limit position and an end-of-tape switch contact at the other limit position.

5. A magnetic tape recorder and playback apparatus as claimed in claim 1, wherein said feed and stepping mechanism comprises a solenoid power unit and drive train cooperating with said tape and said stepping mechanism to draw sufficient tape from said tape supply ahead of said head means, to enable a subsequent stepping movement of the tape past the head means, and to provide storage of sufficient power in the stepping portion of said drive mechanism to enable stepping of the tape subsequent to the tape feed movement.

6. A magnetic tape recorder and playback apparatus as claimed in claim 1, wherein said tape stepping mechanism comprises a tape stepping wheel located behind the head means and having positive engagement with the tape; a ratchet wheel secured to said stepping wheel; a pawl adapted to engage said ratchet wheel for blocking movement of said stepping wheel in a tape stepping direction; a spring loaded lost motion device in the drive train between said feeding portion of said drive mechanism and said stepping wheel adapted to be spring loaded, in a direction urging said stepping wheel in a tape stepping direction, in response to each tape feed movement; and means to selectively momentarily release said stepping pawl to enable a single tape stepping movement under the power stored in said lost motion connection.

References Cited by the Examiner

UNITED STATES PATENTS 3,127,121 3/1964 Babin ____________ 266—121 X

BERNARD KONICK, *Primary Examiner.*

A. I. NEUSTADT, *Examiner.*